United States Patent
Ohbitsu

(10) Patent No.: US 8,385,431 B2
(45) Date of Patent: Feb. 26, 2013

(54) MOVING PICTURE DATA DECODING DEVICE

(75) Inventor: Toshiro Ohbitsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1169 days.

(21) Appl. No.: 11/949,327

(22) Filed: Dec. 3, 2007

(65) Prior Publication Data

US 2008/0175326 A1   Jul. 24, 2008

(30) Foreign Application Priority Data

Jan. 19, 2007   (JP) ................................ 2007-010264

(51) Int. Cl.
*H04N 7/12*   (2006.01)

(52) U.S. Cl. ......... 375/240.27; 375/240.12; 375/240.25; 348/415.1

(58) Field of Classification Search ............. 375/240.12, 375/240.13, 240.15, 240.16, 240.24, 240.25, 375/240.27; 348/415.1, 420.1, 409.1, 384, 348/390
See application file for complete search history.

(56) References Cited

U.S. PATENT DOCUMENTS

| | | | | |
|---|---|---|---|---|
| 6,081,296 A * | 6/2000 | Fukunaga et al. | ....... | 375/240.12 |
| 6,489,996 B1 | 12/2002 | Matsumura et al. | | |
| 2002/0018525 A1 * | 2/2002 | Nishi et al. | ............... | 375/240.27 |
| 2003/0081671 A1 | 5/2003 | Ishida et al. | | |
| 2003/0122959 A1 | 7/2003 | Ishida et al. | | |
| 2004/0086044 A1 * | 5/2004 | Kondo et al. | ............ | 375/240.13 |
| 2004/0086045 A1 * | 5/2004 | Yoneyama | ............... | 375/240.13 |
| 2005/0100099 A1 * | 5/2005 | Nishi et al. | ............... | 375/240.25 |
| 2007/0242080 A1 | 10/2007 | Hamada et al. | | |
| 2009/0141798 A1 * | 6/2009 | Adachi et al. | ............ | 375/240.12 |

FOREIGN PATENT DOCUMENTS

| | | |
|---|---|---|
| CN | 1194503 A | 9/1998 |
| EP | 0 868 086 A1 | 9/1998 |
| EP | 1 306 992 | 5/2003 |
| JP | 2000-102018 | 4/2000 |
| JP | 2002-320156 | 10/2002 |
| JP | 2003-134064 | 5/2003 |
| JP | 2006-174209 | 6/2006 |
| JP | 2007-288462 | 11/2007 |

OTHER PUBLICATIONS

Chinese Office Action issued Jun. 17, 2010 in corresponding Chinese Patent Application 200810001529.X.
Chinese Office Action issued Aug. 21, 2009 in corresponding Chinese Patent Application 200810001529.X.
Japanese Office Action issued on Oct. 12, 2010 in corresponding Japanese Patent Application 2007-010264.

* cited by examiner

*Primary Examiner* — Hassan Phillips
*Assistant Examiner* — Ajay Cattungal
(74) *Attorney, Agent, or Firm* — Staas & Halsey LLP

(57) ABSTRACT

To aim at outputting video signals causing a viewer to feel none of a sense of discomfort even if a partial or entire lack of the picture occurs in a device that decodes a datastream of a compressed moving picture of one-segment broadcasting etc and outputs the video signals. A moving picture data decoding device includes a buffer unit 26 buffered with a predetermined quantity of already-decoded pictures decoded by a decoding process, and a picture generation unit 23 configured to generate pictures and, if there is a missing picture used for interframe prediction (S202), performing the picture generation (S205) in a way that acquires a substitute reference picture with which to substitute the missing picture from the already-decoded pictures buffered in the buffer unit 26 (S203).

4 Claims, 10 Drawing Sheets

MOVING PICTURE DATA DECODING DEVICE

This application claims the benefit of Japanese Patent Application No. 2007-010264 filed on Jan. 19, 2007 in the Japanese Patent Office, the disclosure of which is herein incorporated in its entirety by reference.

BACKGROUND

The present invention relates to a moving picture data decoding device that executes a decoding process including picture generation based on interframe prediction.

On the occasion of decoding compressed moving picture data and displaying a picture, a technology for dealing with a missing picture is exemplified by a method of supplementing the missing picture with another picture (refer to Patent document 1) and a method of carrying out decoding based on past data one frame before on condition that the frame is not an IDR (Instantaneous Decoder Refresh) frame (refer to Patent document 2).

[Patent document 1] Japanese Patent Application Laid-Open Publication No. 2002-320156
[Patent document 2] Japanese Patent Application Laid-Open Publication No. 2006-174209
[Patent document 3] Japanese Patent Application Laid-Open Publication No. 2003-134064

SUMMARY OF DISCLOSURE

One-seg broadcasting (one-segment broadcasting) can be audio/video-received by use of a personal computer connected to a tuner and an antenna that are capable of receiving the one-segment broadcasting. Herein, the personal computer mounted with a variety of devices and therefore generates itself radio waves (jamming) that interfere with reception of the one-segment broadcasting as the case may be. For example, when a DVD drive, which reads and writes a DVD, starts reading the DVD, the electric power instantaneously reaches its peak, and the radio waves interfering with receiving preferably the one-segment broadcasting are generated as affected by this power peak. Further, in the case of audio/video-receiving the one-segment broadcasting with mobile equipment such as a notebook type personal computer, a receiving condition does not reach an acceptable level in some cases depending on a state of movement and an environment.

In these cases, video data and sound data are not output from the one-segment broadcasting tuner, a partial or entire lack of a picture is caused, resulting in occurrence of such a phenomenon that the picture and the sound are stopped or disturbed. For others, the missing picture occurs due to some cause without being limited to the influence of the interference radio waves (jamming) from the equipment, resulting in the occurrence of the phenomenon that the picture and the sound are stopped or disturbed in some cases.

Herein, a method of supplementing the missing picture with another picture is given as a coping method that has hitherto been taken. This coping method, however, has a problem that the missing picture is simply supplemented with another picture, and hence the supplemented portion comes to have continuation of the same picture. Another method is that if a reception-disabled state occurs, the decoding is conducted based on the past data one frame before on condition that the frame is not the IDR frame. This coping method has a problem of being unable to cope with the case where there is missing data of the picture related to the IDR frame though there is no lack of the IDR frame itself.

The present invention aims at, in view of the problems described above, outputting video signals causing a viewer to feel none of a sense of discomfort even if a partial or entire lack of the picture occurs in a device that decodes a datastream of a compressed moving picture of one-segment broadcasting etc and outputs the video signals.

According to the present invention, in order to solve the problems described above, already-decoded pictures are buffered for a predetermined period of time, thereby enabling the pictures to be generated in a way that acquires a substitute reference picture from the buffered already-decoded pictures even if there is occurrence of a missing reference picture employed for the interframe prediction.

To be specific, the present invention is a moving picture data decoding device executing a decoding process including picture generation by interframe prediction based on a compressed moving picture datastream, comprising: a buffer buffered with a predetermined quantity of already-decoded pictures decoded by the decoding process; and a picture generation unit configured to generate pictures and, if there is a missing reference picture used for the interframe prediction, performing the picture generation in a way that acquires a substitute reference picture with which to substitute the missing picture from the already-decoded pictures buffered in the buffer.

Herein, the compressed moving picture datastream is a datastream of the moving picture data received via broadcasting and streaming and is exemplified by TS (Transport Stream) signals output from a one-segment broadcasting tuner.

If there is the missing reference picture, the generation of picture has hitherto been disabled, or the picture with a lack of information has hitherto been generated, however, according to the present invention, it is feasible to, even if there is the missing reference picture, generate the picture causing the viewer to feel none of a sense of discomfort by using the buffered already-decoded picture as the substitute reference picture, and to prevent the pictures from being disturbed and stopped.

Moreover, the moving picture data decoding device according to the present invention may further comprise: an interface with a display device; and an output control unit outputting, to the display device, video signals based on the already-decoded pictures with a delay of a predetermined period of time since the time when the compressed moving picture datastream has been received or inputted in a state of being buffered with the predetermined quantity of already-decoded pictures, wherein the picture generation unit, if the missing picture occurs due to a lack of information of the compressed moving picture datastream, may acquire a reference picture or the substitute reference picture from the already-decoded pictures buffered in the buffer, then may perform the picture generation and supplements the missing picture.

According to the present invention, even if the missing picture occurs, the picture is generated in a way that uses the buffered already-decoded picture as the reference picture, and the missing picture can be supplemented (with the generated picture). Note that in the case of generating the picture for the supplement, if the missing reference picture occurs, the substitute reference picture can be employed.

Still further, the present invention can be grasped as a method executed by a computer or a program making the computer perform the execution. Yet further, the present invention may also be a recording medium recorded with such a program readable by the computer, other devices, machines, etc. Herein, the recording medium readable by the computer etc connotes a recording medium capable of storing information such as data and programs electrically, magnetically, optically, mechanically or by chemical action, which can be read from the computer etc.

The present invention enables an output of the video signals causing a viewer to feel none of a sense of discomfort even if a partial or entire lack of the picture occurs in a device that decodes a datastream of a compressed moving picture of one-segment broadcasting etc and outputs the video signals.

DETAILED DESCRIPTION

An embodiment, in which an information device according to the present invention is put into an operation as a personal computer, will hereinafter be described with reference to the drawings. A configuration in the following embodiment is an exemplification, and the present invention is not limited to the configuration in the embodiment.

<Substance of the Invention>

One-segment broadcasting involves using H.264/AVC (Advanced Video Coding) (level 1.2, 320×240 pixels or 320× 180 pixels, the minimum frame interval: 1/15 sec) as a compression coding system. This compression coding system adopts a picture generation method based on an interframe prediction as a method of generating a picture from compressed moving picture (dynamic image) data.

Figure 1:
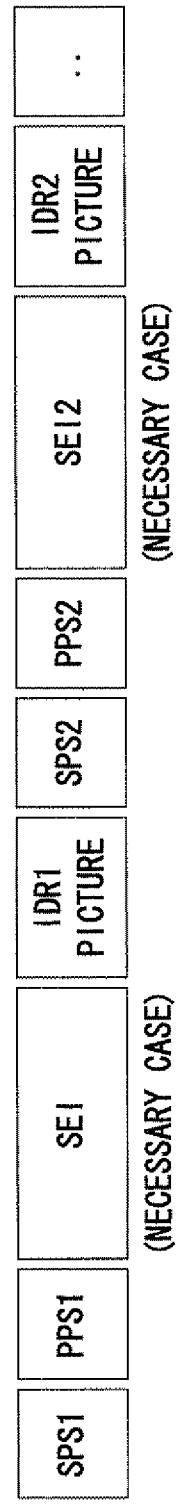
FIG. 1 is a diagram showing a data structure of H.264/AVC.

FIG. 1 is a diagram showing a data structure of H.264/AVC. The data of H.264/AVC includes SPS (Sequence Parameter Set) defined as a header containing information on a code of the whole sequence, PPS (Picture Parameter Set) defined as a header representing a coding mode of the whole picture, SET (Supplemental Enhancement Information) added if necessary, an IDR picture (Instantaneous Decoder Refresh Picture) and so on. In the one-segment broadcasting, the interframe prediction is conducted from three or less reference pictures, and a P picture (Predictive Picture) is generated.

The personal computer according to the present embodiment is a personal computer that includes a tuner for receiving the one-segment broadcasting and a decoding means thereof, and enables the one-segment broadcasting to be audio/video-received by displaying pictures based on decoded video signals on a display unit (display). This type of personal computer might, it is considered, to have a temporary failure of receiving the frames due to generation of interference radio waves (jamming) from a device itself provided in the personal computer and to have occurrence of a missing picture.

Figure 2:
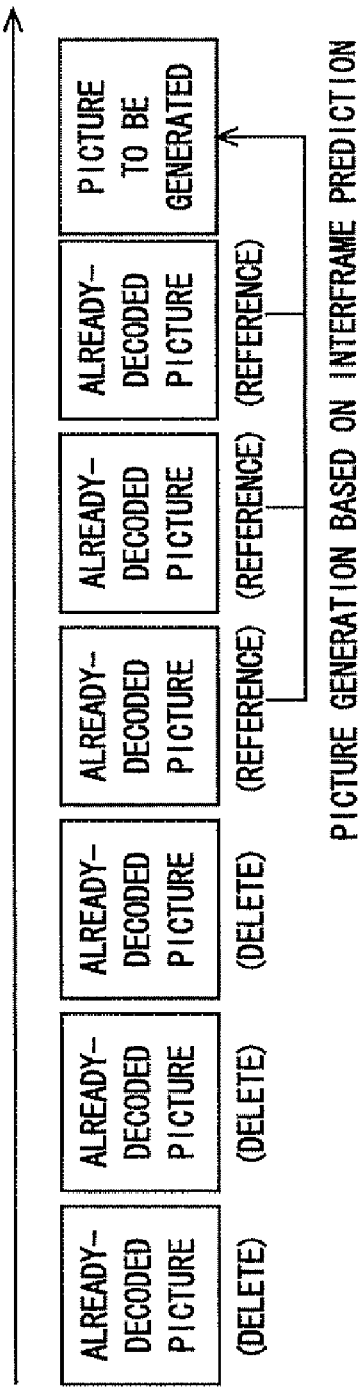
FIG. 2 is a diagram showing how conventional already-decoded pictures are handled.
Figure 3:
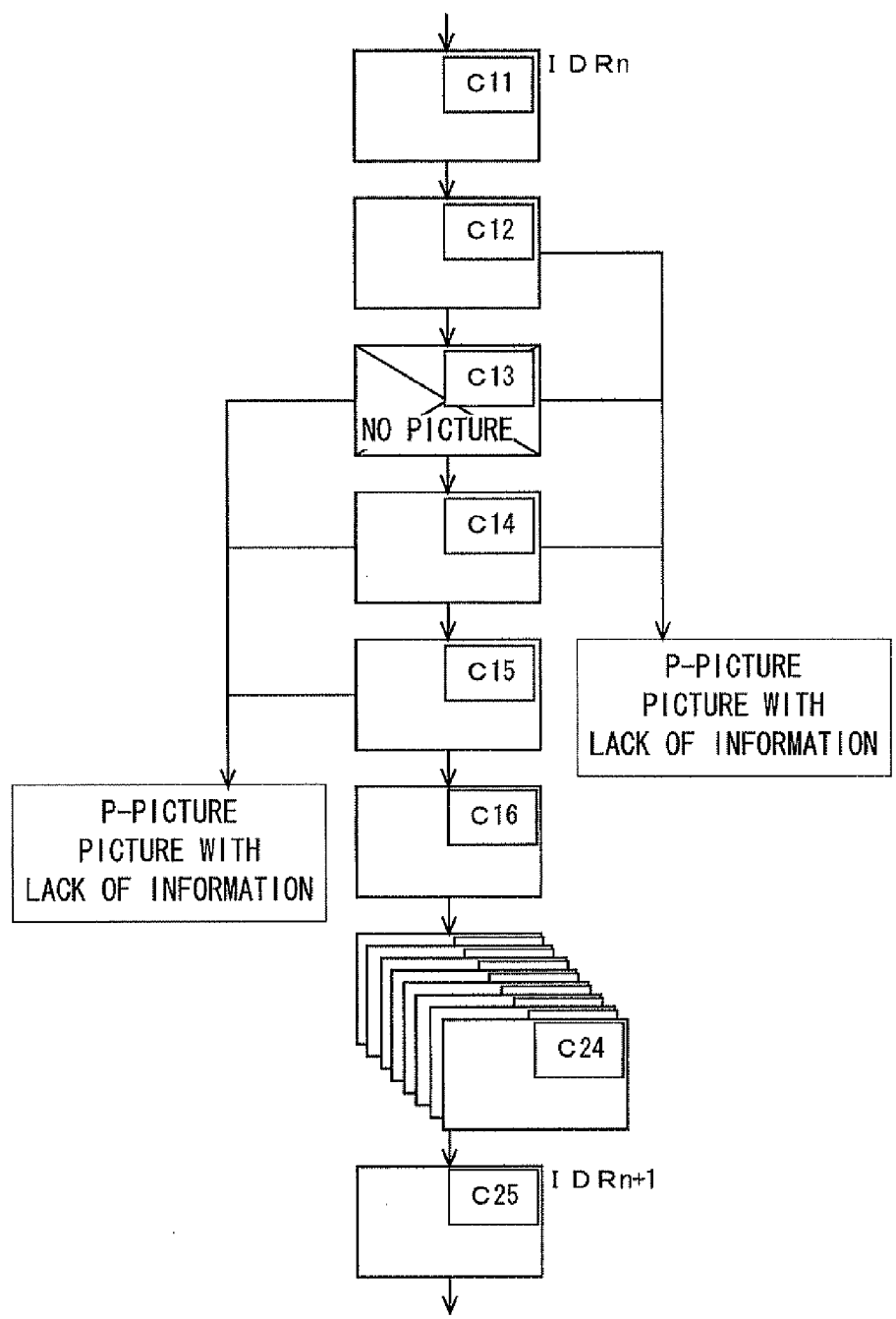
FIG. 3 is a diagram illustrating a conventional display method if a missing picture occurs.
Figure 4:
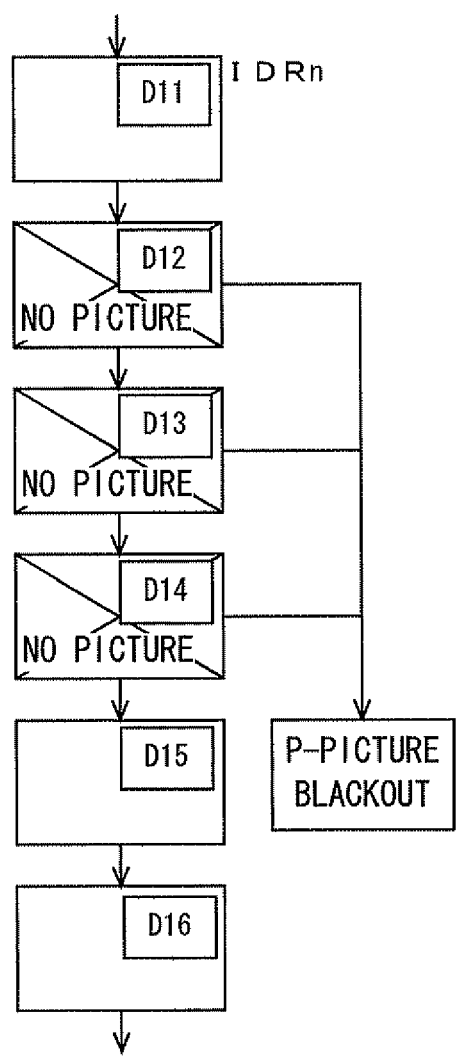
FIG. 4 is a diagram illustrating the conventional display method if the missing picture occurs.

In a conventional one-segment broadcasting audio/video receiver, the past coded pictures are sequentially deleted from a memory (see FIG. 2), and hence, if a missing picture occurs, it is impossible to prevent the picture with a lack of information from being output as it is and to prevent the displayed picture from undergoing a blackout (see FIGS. 3 and 4).

Figure 5:
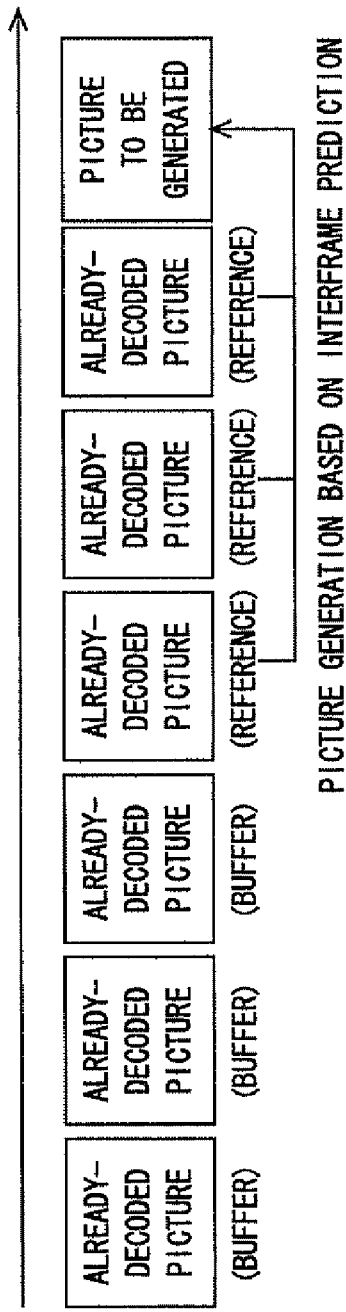
FIG. 5 is a diagram showing how the already-decoded pictures are handled according to the present invention.

Such being the case, the personal computer according to the present embodiment is contrived to buffer the already-decoded pictures for 3 sec estimated as a period of reproducing time (i.e., contrived not to delete the already-decoded pictures from the memory on the computer) (see FIG. 5). Then, if there is a missing reference picture needed for generating the pictures, a necessary number of reference pictures are completed by acquiring the reference picture serving as a substitute from the already-decoded pictures buffered therein, and the picture generation using the interframe prediction is performed based on the reference pictures including the substitute reference picture (see FIG. 6).

Namely, the personal computer according to the present embodiment is capable of outputting the video signals from which to display the pictures causing a viewer watching the displayed pictures to feel none of a sense of discomfort in a way that prevents, even if the missing reference picture occurs, the pictures with the lack of information from being output and the pictures from undergoing the blackout.

In the present embodiment, a quantity of the already-decoded pictures to be buffered is equivalent to 3 sec in the case of converting this quantity into a period of time for which the already-decoded pictures are displayed as moving pictures. In the one-segment broadcasting, 15 frames are displayed per second, and therefore the already-decoded pictures for approximately 45 frames are buffered.

Further, the personal computer according to the present embodiment displays a 3-sec delay by use of this buffer. Namely, in the case of audio/video-receiving the one segment broadcasting with the personal computer according to the present embodiment, the picture is displayed with the 3-sec delay as compared with a case of audio/video-receiving the one segment broadcasting with other normal types of one-segment broadcasting audio/video receivers. The delay display enables, even when the missing picture occurs due to the lack of information of the TS signals, the missing picture to be supplemented by generating the pictures in a way that uses the buffered already-decoded picture as the reference picture without outputting the video signals with the missing picture as they are.

A buffer size and the delay time are, it is preferable, set large to the greatest possible degree in terms of taking account of a possibility that the picture of 3 sec or longer ago might be used as the substitute reference picture, however, the value "3 sec" is adopted in the present embodiment in terms of considering an allowable range of the delay when actually watching and listening to the one-segment broadcasting and a size of the buffer area that can be ensured on the personal computer. It is, however, preferable that the buffer size and the delay time are set to optimal values properly for every embodiment. For example, a thinkable scheme is that the buffer size is increased by augmenting a possible-of-being-ensured capacity of a main memory in a way that terminates a resident application and an unnecessary application but does not employ part of the main memory as a video memory (by providing a sole video memory).

<Outline of Configuration of Personal Computer>

Figure 7:
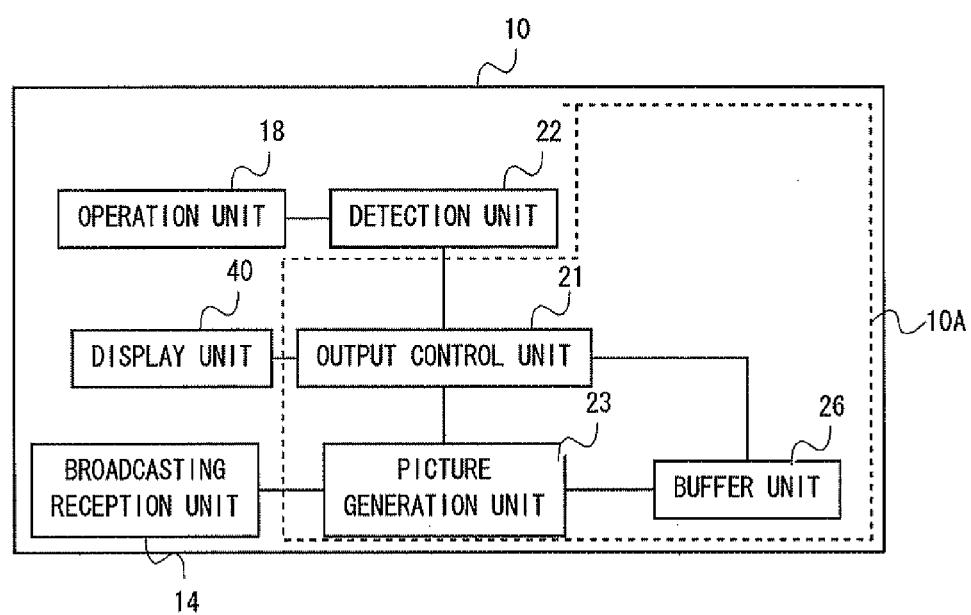
FIG. 7 is a diagram showing an outline of a configuration of a personal computer according to an embodiment.

FIG. 7 is a diagram of an outline of a configuration of a personal computer 10 according to the present embodiment. The personal computer 10 includes an operation unit 18 that operates the personal computer 10 upon receiving a user's operation, a detection unit 22 that detects an operation of the operation unit 18, a broadcasting reception unit 14 that receives TV broadcasting, a moving picture data decoding device 10A that outputs to a display unit 40 an already-decoded picture decoded based on the TS signals output from the broadcasting reception unit 14, and the display unit 40 that displays a broadcasting program received by the broadcasting reception unit 14 on the basis of inputted video signals.

Further, the moving picture data decoding device 10A include a picture generation unit 23 that decodes the TS signals output from the broadcasting reception unit 14, a buffer unit 26 stored with a fixed quantity of already-decoded pictures generated by the picture generation unit 23, and an output control unit 21 that outputs the already-decoded pictures to the display unit 40.

These function units can be realized by the computer including a CPU, a memory, etc and by a program executed on the computer.

Herein, the operation unit 18 is exemplified such as an input device of the computer, a remote control operation unit constructed by combining an infrared-ray detection unit with an infrared-ray remote controller, a knob for a channel operation and an operation button.

The detection unit 22 detects the operation (e.g., switchover of the reception channel) of the operation unit 18 via an interface between the operation unit 18 and the CPU, a device driver that processes a signal of the interface and an OS (operating system) that transfers and receives the signal to and from the operation unit 18 through the device driver.

A dedicated piece of hardware may be, however, provided as the detection unit 22. For example, the processing of the CPU may be shared by providing an input signal processing circuit for the operation unit. A keyboard controller, a mouse controller, etc are known as this type of processing circuit.

Further, for instance, a dedicated input control processor for processing the signal transmitted from the operation unit 18 may be separately provided. The input control processor converts the signal of the operation unit 18 into a predetermined signal and simply may transmit the signal to the output control unit 21.

The broadcasting reception unit 14 is a so-called One-Seg tuner. The broadcasting reception unit 14 receives the broadcasting waves with an antenna and outputs a compressed moving picture datastream (TS signals) based on the received broadcasting waves.

The picture generation unit 23 generates the pictures of the respective frames that assemble the moving picture on the basis of the TS signals output from the broadcasting reception unit 14. Herein, the present embodiment involves executing a picture generation process including P-picture generation based on the interframe prediction. The picture generation unit 23 may be configured as a computer program executed on the CPU. The picture generation unit 23 may also be, however, constructed as a dedicated processor that generates the pictures based on the TS signals and outputs the thus-generated pictures.

The buffer unit 26 is buffered with the generated already-decoded pictures. The buffer unit 26 accepts an input of the already-decoded pictures generated by the picture generation unit 23 and is buffered with the already-decoded pictures for 3 sec estimated as the reproducing time. The buffer unit 26 may be constructed in the form of a recording medium such as a power-backed-up volatile memory controlled by a computer program executed on the CPU, a nonvolatile memory like a flash memory etc and a hard disk or a portable medium. The buffer unit 26 may also be, however, constructed as a dedicated memory buffered with the inputted already-decoded pictures.

The output control unit 21 has an interface with the display unit 40, and controls the video signals output to the display unit 40. The output control unit 21, according to the signal detected by the detection unit 22, reads the already-decoded pictures buffered in the buffer unit 26, then converts the decoded pictures into the video signals and outputs the converted video signals to the display unit 40. On this occasion, the output control unit 21 outputs the video signals with a 3-sec delay from the time when the broadcasting has been received. The output control unit 21 may be configured as a computer program executed on the CPU. The output control unit 21 may also be, however, constructed as a dedicated processor that outputs, after converting the moving picture data etc into an output format to the display unit 40, the video signals.

The display unit 40, which is a so-called monitor, receives an input of the video signals output from the output control unit 21 and displays the pictures.

<Configuration of Personal Computer>

Figure 8:
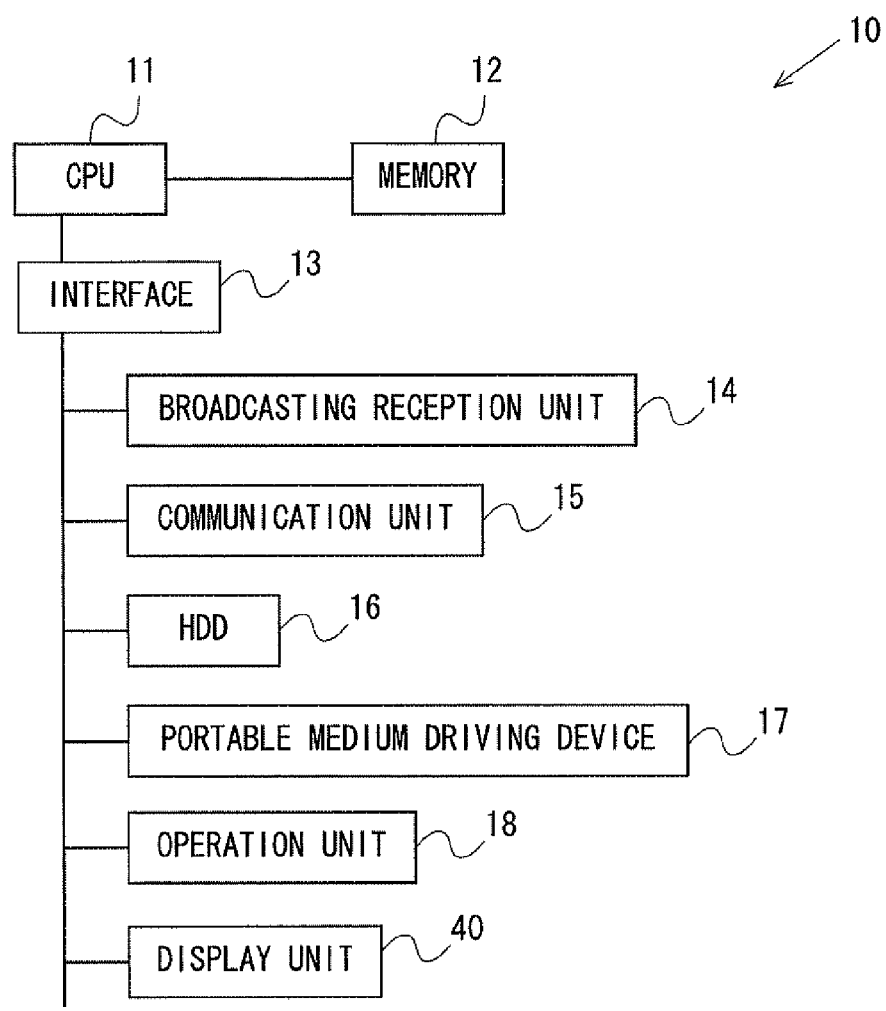
FIG. 8 is a diagram showing an example of an in-depth configuration of the personal computer according to the embodiment.

FIG. 8 is a diagram showing an example of an in-depth configuration of the personal computer 10 according to one embodiment of the present invention. As in FIG. 8, the personal computer 10 includes devices such as a CPU 11 executing the computer program and controlling the personal computer 10, a memory 12 stored with the computer program executed by the CPU 11 or data processed by the CPU 11 and an interface 13 that connects the CPU 11 to a variety of devices, and a group of devices such as a broadcasting reception unit 14, a communication unit 15, a hard disk driving device 16, a portable medium driving device 17, an operation unit 18 and a display unit 40, which are connected via the interface 13 (to the CPU 11).

Herein, the CPU 11 executes the computer program and thus controls the respective units of the personal computer 10, thereby making the personal computer 10 function as a device including the function units such as the detection unit 22, the broadcasting reception unit 14, the output control unit 21, the picture generation unit 23, the buffer unit 26 and the output control unit 21. The memory 12 is stored with the program executed by the CPU 11 and the data processed by the CPU 11. The memory 12 includes a volatile RAM (Random Access Memory) and a nonvolatile ROM (Read Only Memory). The ROM includes rewritable semiconductor memories such as a flash memory, an EPROM (Erasable Programmable Read-Only Memory), an EEPROM (Electrically Erasable Programmable Read-Only Memory).

The interface 13 may be any one of a serial interface such as a USB and a parallel interface such as PCI (Peripheral Component Interconnect), ISA (Industry Standard Architecture), EISA (Extended ISA), ATA (AT Attachment), IDE (Integrated Drive Electronics), IEEE1394 and SCSI (Small Computer System Interface). Note that the interface is described as the interface 13 in FIG. 8, however, the CPU 11 may also be connected to the respective devices via different interfaces. Further, a plurality of interfaces may be bridge-connected.

The broadcasting reception unit 14 is a TV tuner for the one-segment broadcasting. The broadcasting reception unit 14 includes, in addition to a high-frequency unit having a tuning circuit and an amplifier, a decoder (a demodulator for OFDM (Orthogonal Frequency Division Multiplexing)) for digital signals.

Herein, the high-frequency unit converts high-frequency electromagnetic waves into baseband signals. Moreover, the OFDM demodulator includes an FFT (Fast Fourier Transform) processing circuit and an orthogonal demodulator, and generates the digital signal from the baseband signal. These processes may be organized by a dedicated digital circuit that executes a sum-of-products operation. Further, these processes may also be organized by a processor such as a DSP (Digital Signal Processor) and by a program. Furthermore, an LSI for demodulation, which is manufactured based on the TV broadcasting standards and is available on the market, may also be employed.

The communication unit 15 is an interface with a broadband network. The broadband network is a cable network such as a LAN (Local Area Network), a cable TV network, xDSL (x Digital Subscriber Line), ADSL (Asymmetric Digital Subscriber Line) and an optical network, or a wirelessly accessible network such as a wireless LAN and a fixed wireless access (FWA). The communication unit 15 acquires, e.g., the computer program installed in the hard disk driving device 16, an electronic program guide (EPG) of the TV broadcasting, etc from a server on the network. These broadband networks can be generally connected to the Internet.

The hard disk driving device 16 stores the program to be loaded into the memory 12. Further, the hard disk driving device 16 stores the data processed by the CPU 11.

Note that the hard disk driving device 16 is not limited to the single device, but a plurality of hard disk driving devices 16 may also be provided. Further, the hard disk driving device 16 may also be a device managed by another computer, e.g., a disk server on the network. In this case, it may be sufficient for the CPU 11 to communicate with the disk server via the communication unit 15. Then, it is enough for the CPU 11 to display the EPG (Electronic Program Guide) etc acquired from the disk server on the display unit 40.

The portable medium driving device 17 is a driving device for, e.g., a CD (Compact Disc), a DVD (Digital Versatile Disk), an HD-DVD (High Definition-DVD), a Blu-ray disc and so on. Furthermore, the portable medium driving device 17 may also be an input/output device of a card medium, which has a nonvolatile memory such as the flash memory. The medium driven by the portable medium driving device 17 retains the computer program installed in the hard disk driving device 16, the moving picture data, etc.

The operation unit 18 is an input device of the computer, such as a keyboard and a pointing device. Moreover, the operation unit 18 includes the remote control operation unit constructed by combining the infrared-ray detection unit with the infrared-ray remote controller, a variety of switches, the knob for the channel operation, etc. The pointing device is not limited to a particular type, and, among the mouse, a track ball, a dial-type operation unit, a stick type of device that moves a pointer on the display unit 40, a device for detecting a finger manipulation of the user through an electrostatic capacitance, a touch panel, a joystick, etc, a proper device may be employed corresponding to a characteristic of the personal computer 10, needs of the user and so on.

The keyboard transmits an electric signal corresponding to a key inputted according to an input operation by the user to an unillustrated keyboard controller. The keyboard controller transmits a code corresponding to the electric signal to the CPU 11.

The pointing device, when detecting the user's operation, transmits an operation signal to an unillustrated pointing device controller (e.g., an unillustrated mouse controller or the interface 13, etc). The pointing device controller receiving the operation signal transmits information for generating a direction of the operation and a quantity of the operation to the CPU 11. A device driver of the CPU 11, based on the operation signal given from the pointing device controller, displays and moves a pointer on a screen of the display unit 40.

Further, the OS of the CPU 11 determines a positional relationship between the pointer and an object (a window, a button, a menu, a list, etc) on the screen. Then, the object in a position where the pointer is located is set in a selecting status or a focusing status. Moreover, the selection of the object is established by a selection establishing operation for the pointing device, e.g., by pressing the mouse button.

The display unit 40 is exemplified such as a liquid crystal display device, a plasma display panel, a CRT (Cathode Ray Tube) and an electroluminescence panel. Note that the display unit 40 includes, though not illustrated, a RAM stored with the image data and a driving circuit that drives the display unit 40 on the basis of the data in the RAM. The RAM stored with the image data, the driving circuit driving the display unit 40, etc may, however, be provided independently as image processing boards. In this case, the data organizing the screen information given from the CPU 11 is inputted to the image processing boards.

Further, the display unit 40 is attached with a loudspeaker from which to output sounds (voices and acoustic elements other then the voices) generated by the broadcasting reception unit 14 and sounds red from the portable medium driving device 17 and reproduced by an unillustrated voice synthesizing board. The voice synthesizing board converts digital data of, e.g., MP3 (MPEG-1 Audio Layer-3) etc into the sound.

The information device according to the present invention can be constructed as the personal computer 10 described above. The information device according to the present invention is not, however, limited to the personal computer and may also be a different type of device, e.g., a television receiving device having the same functions. Moreover, the information device can be realized by a tuner for receiving the TV broadcasting, a set-top box for receiving the TV broadcasting, a mobile phone with a TV broadcasting receiving function, a mobile information terminal (personal digital assistant (PDA)) with the TV broadcasting receiving function, a game machine with the TV broadcasting receiving function, an onboard device with the TV broadcasting receiving function, etc.

<Processing Flow>

Figure 9:
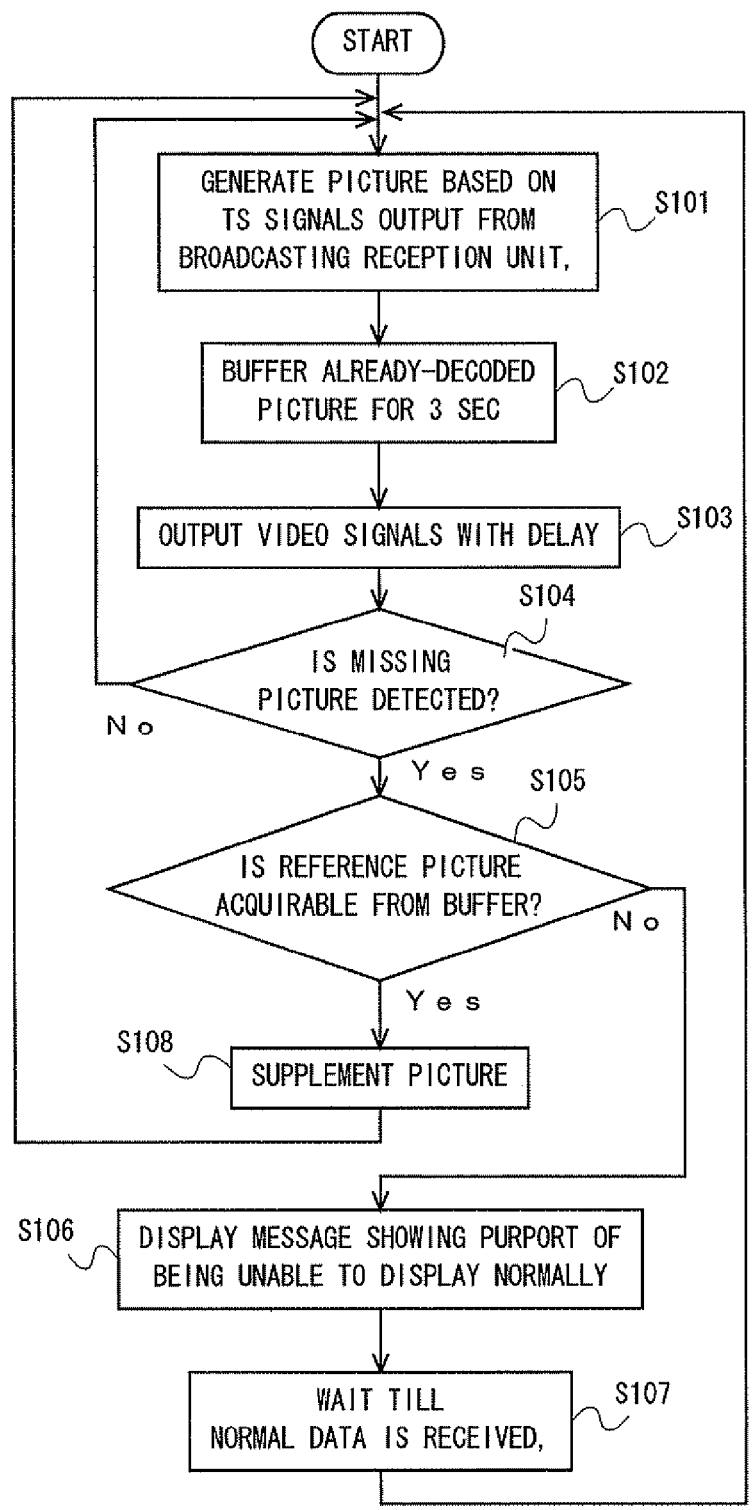
FIG. 9 is a flowchart showing a flow of a whole image data decoding process.
Figure 10:
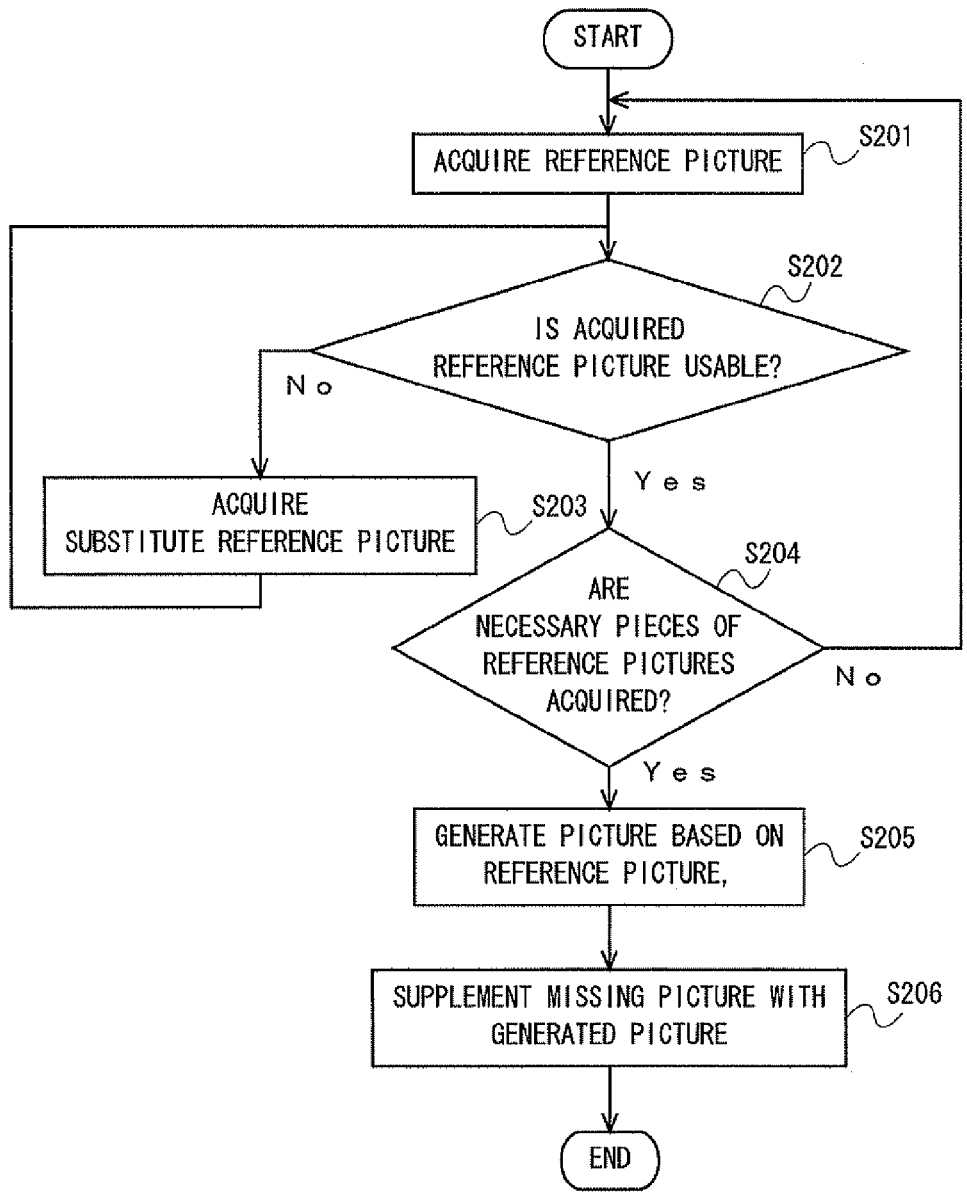
FIG. 10 is a flowchart showing a flow of a process of generating a picture based on interframe prediction and supplementing the missing picture.

FIGS. 9 and 10 each show a processing flow of the personal computer 10. FIG. 9 is a flowchart showing a flow of a whole image data decoding process. Execution of the image data decoding process shown in the flowchart is triggered by the detection unit 22 receiving a TV viewing starting operation in the operation unit 18 and then issuing an instruction of starting the image data decoding process to the output control unit 21.

In step S101, pictures based on a datastream output from the broadcasting reception unit 14 are generated. The picture generation unit 23 generates, based on the TS signals output from the broadcasting reception unit 14, the pictures of respective frames, which are needed for displaying the moving picture. On this occasion, a P-picture (Predictive picture) is generated based on the interframe prediction that entails referring to one through three pieces of already-decoded I-pictures (Intra pictures) or P-pictures. Thereafter, the processing advances to step S102.

In step S102, the already-decoded pictures for 3 sec are buffered. The buffer unit 26 buffers the pictures generated by the picture generation unit 23 for 3 sec estimated as the reproducing time. Thereafter, the processing proceeds to step S103.

In step S103, the video signals are output with a delay. The output control unit 21, in a status where the already-decoded pictures for 3-sec are buffered, reads the already-decoded pictures with the 3-sec delay from the time when receiving the broadcasting, and outputs the readout pictures to the display unit 40. Namely, the output control unit 21 outputs the pictures with the 3-sec delay by making use of the buffer unit 26. Thereafter, the processing proceeds to step S104.

In step S104, it is monitored whether there is a missing picture or not. The picture generation unit 23 monitors whether or not the already-decoded pictures buffered in the buffer unit 26 include a picture with a lack of information or undergoing blackout, i.e., whether there is the missing picture or not. If the missing picture is not detected, there are repeated the picture generating process shown step S101, the buffer process shown in step S102, the output process shown in step S103 and the monitoring process shown in step S104. Whereas if the missing picture is detected, the processing proceeds to step S105.

In step S105, it is determined whether or not the reference picture can be acquired from the buffered data within 3 sec. The picture generation unit 23, if there is the missing picture, determines whether the already-decoded picture becoming a candidate for the reference picture for generating the missing picture is buffered or not. Namely, the buffer unit 26 is buffered with the already-decoded pictures for 3 sec, and hence, though capable of acquiring the reference picture from the buffered already-decoded pictures if the reference picture needed for generating the missing picture is the picture within 3 sec in the past, it is impossible to acquire the reference picture from the buffered already-decoded pictures whereas if the reference picture needed for generating the missing picture is the picture that does not exist within the 3 sec. When determining that the reference picture is acquirable, the processing proceeds to step S108. When determining that the reference picture is not acquirable, the processing proceeds to step S106.

In step S106, a message saying a purport of being unable to display normally, is displayed. The output control unit 21 detects that the picture generation unit 23 is disabled to supplement the missing picture, and outputs the video signals containing the message saying the purport of being unable to display normally, to the display unit 40. In response to this operation, the message saying the purport of being unable to display normally, is displayed on the display unit 40, and the viewer can grasp that it comes to a viewing-disabled state due to some factor. Thereafter, the processing proceeds to step S107.

Step S107 involves executing a standby process till the normal data is received. When the broadcasting reception unit 14 receives the normal data, the processing proceeds to step S101, wherein the video output and the video display are restarted.

In step S108, a missing picture supplement process is carried out. The picture generation unit 23 acquires the reference picture from the already-decoded pictures buffered by the buffer unit 26, and supplements the missing picture due to the interframe prediction based on this reference picture. An in-depth description of the supplement process will be made with reference to FIG. 10. Thereafter, the processing proceeds to step S101.

FIG. 10 is a flowchart showing a flow of the process of generating the picture by the interframe prediction and supplementing the missing picture. The missing picture supplement process shown in the flowchart corresponds to step S108 shown in FIG. 9.

In step S201, the reference picture is acquired. The picture generation unit 23 one through three pieces of already-decoded pictures buffered by the buffer unit 26 as the reference pictures used for the interframe prediction. Thereafter, the processing proceeds to step S202.

In step S202, it is determined whether the acquired reference picture is usable or not. The picture generation unit 23 determines whether or not the reference picture (the already-decoded picture) acquired in step S201 is a normal picture usable for the interframe prediction. If the acquired picture is determined to be unusable as the reference picture because of being the picture undergoing the blackout and so on, the processing proceeds to step S203. Whereas if the acquired picture is determined to be usable as the reference picture, the processing proceeds to step S204.

Figure 6:
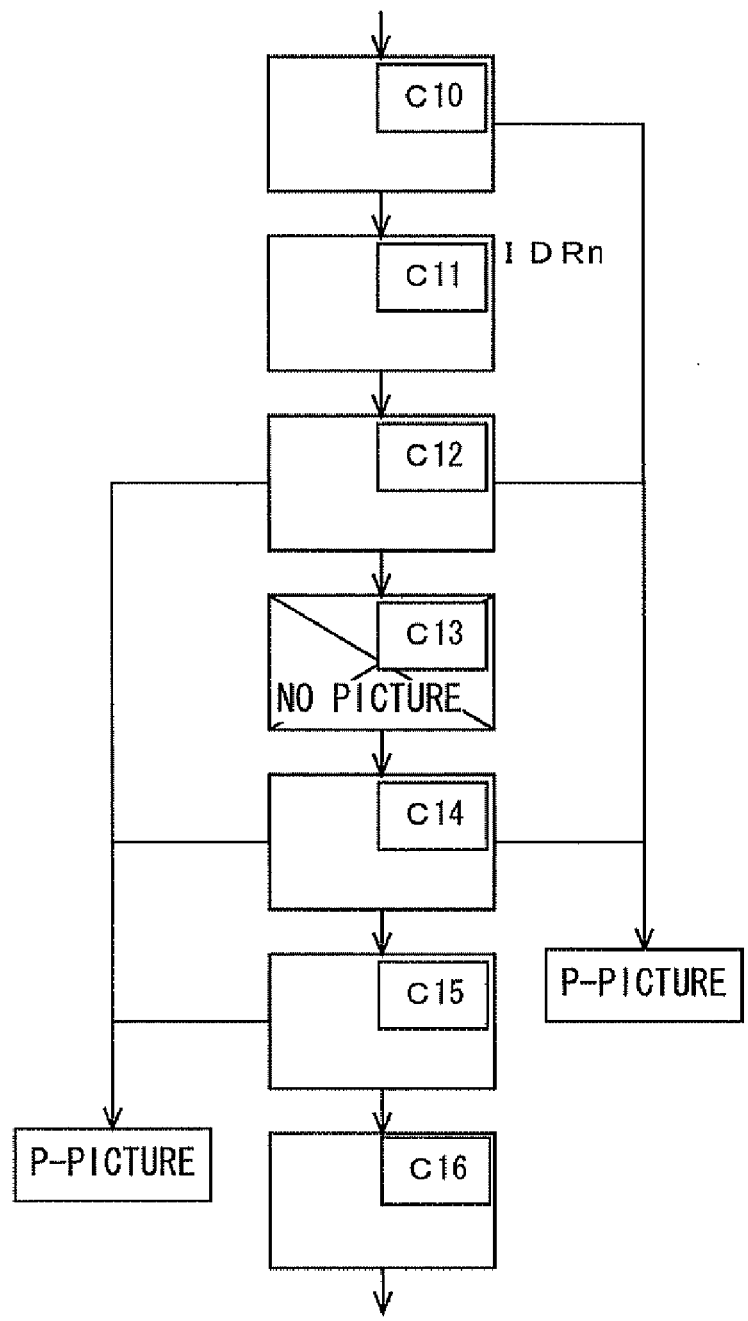
FIG. 6 is a diagram illustrating a display method according to the present invention if the missing picture occurs.

In step S203, a substitute reference picture is acquired. The picture generation unit 23 acquires, as the substitute reference picture, the already-decoded picture of the frame one before the frame of the missing reference picture from within the already-decoded pictures buffered by the buffer unit 26. To explain it with reference to FIG. 6, C13, C14 and C15 are the reference pictures required for generating the pictures, and, if the missing picture is the reference picture C13, the reference picture C12 is acquired as the substitute reference picture. Thereafter, the processing proceeds to step S202, wherein it is determined whether the acquired substitute reference picture can be employed or not. Namely, the picture generation unit 23 traces the buffered already-decoded pictures till the usable substitute reference picture is acquired. For example, as illustrated in FIG. 6, the necessary reference pictures are the pictures C12, C13 and C14, however, if the missing picture is the reference picture C13, a picture C10 may be acquired as the substitute reference picture.

In step S204, it is determined whether a necessary number of reference pictures used for the interframe prediction are acquired or not. the picture generation unit 23 determines whether a necessary number of reference pictures including the substitute reference picture for generating the pictures based on the interframe prediction, are completed or not. When determining that the necessary number of reference pictures are acquired, the processing proceeds to step S205. When determining that the necessary number of reference pictures are not acquired, the processing proceeds to step S201. Namely, the processes in steps S201 through S204 are repeated till the necessary number of reference pictures (which may include the substitute reference picture) are acquired.

In step S205, the pictures are generated based on the acquired reference pictures. The picture generation unit 23 generates the pictures by the interframe prediction on the basis of the reference pictures (which may include the substitute reference picture). Thereafter, the processing proceeds to step S206.

In step S206, the missing picture is supplemented. The picture generation unit 23 supplements the missing picture (the missing picture detected in S104) with the already-decoded picture generated in step S205. Moreover, the buffer unit 26 is buffered with this already-decoded picture (refer to step S102). Note that the output control unit 21 outputs this picture in a way that waits for a 3-sec delay process (refer to step S103). Thereafter, the processes shown in the present flowchart are terminated.

<Modified Example>

FIGS. 9 and 10 illustrate the example in which an internal configuration of the personal computer 10 constructed of, i.e., the detection unit 22, the broadcasting reception unit 14, the output control unit 21, the picture generation unit 23, the buffer unit 26 and the output control unit 21 shown in FIG. 7, is realized by programs executed by the CPU 11. In place of this type of configuration, as described in <Outline of Configuration of Personal Computer>, one or more components of the internal configuration of the personal computer 10 may be realized by a processor, a hardware circuit, etc, which are different from the CPU 11. Namely, depending on a processing capacity and a throughput of the CPU 11, the respective components in FIG. 7 may be constructed of different processors or digital circuits. Even in the case of including the processor or digital circuit different from the CPU 11, the processing procedures are the same as those shown in FIGS. 9 and 10. Namely, the personal computer 10 in the present embodiment can be realized as the program of the CPU 11 or by the dedicated processor and further by the dedicated digital circuit.

<Readable-by-Computer Recording Medium>

A program for making a computer, other machines, devices (which will hereinafter be referred to as the computer etc) realize any one of the functions given above can be recorded on a recording medium readable by the computer etc. Then, the computer etc is made to read and execute the program on this recording medium, whereby the function thereof can be provided.

Herein, the recording medium readable by the computer etc connotes a recording medium capable of storing information such as data and programs electrically, magnetically, optically, mechanically or by chemical action, which can be read from the computer etc. Among these recording mediums, for example, a flexible disc, a magneto-optic disc, a CD-ROM, a CD-R/W, a DVD, a DAT, an 8 mm tape, a memory card, etc are given as those demountable from the computer etc.

Further, a hard disc, a ROM, etc are given as the recording mediums fixed within the computer etc.

What is claimed is:

1. A moving picture data decoding device executing a decoding process including picture generation by interframe prediction based on a compressed moving picture datastream, comprising:

a buffer buffered with a predetermined quantity of already-decoded pictures decoded by the decoding process;

a picture generation unit configured to generate pictures, when there is a missing reference picture in a set of reference pictures used for the interframe prediction for generating a picture, in a way that acquires a substitute reference picture with which to substitute the missing reference picture from the already-decoded pictures buffered in said buffer;

an interface with a display device; and an output control unit to output, to said display device, in a state of being buffered with the predetermined quantity of already-decoded pictures, video signals based on the already-decoded pictures with a delay of a predetermined period of time which is longer than a delay occurring due to the decoding process, since the time when the compressed moving picture datastream has been received or input, wherein said picture generation unit, when the missing picture occurs due to a lack of information of the compressed moving picture datastream, acquires a reference picture or the substitute reference picture from the already-decoded pictures buffered in said buffer, then performs the picture generation and supplements the missing picture, and said substitute reference picture is determined based on a position of the missing reference picture in the set of reference pictures.

2. Information equipment executing a decoding process including picture generation by interframe prediction based on a compressed moving picture datastream, comprising:

a buffer buffered with a predetermined quantity of already-decoded pictures decoded by the decoding process;

a picture generation unit configured to generate pictures, when there is a missing reference picture in a set of reference pictures used for the interframe prediction for generating a picture, in a way that acquires a substitute reference picture with which to substitute the missing reference picture from the already-decoded pictures buffered in said buffer;

an output control unit to output, to said display device, in a state of being buffered with the predetermined quantity of already-decoded pictures, video signals based on the already-decoded pictures with a delay of a predetermined period of time which is longer than a delay occurring due to the decoding process, since the time when the compressed moving picture datastream has been received or input; and a display unit displaying a picture based on the video signals output by said output control unit, wherein said picture generation unit, when the missing picture occurs due to a lack of information of the compressed moving picture datastream, acquires a reference picture or the substitute reference picture from the already-decoded pictures buffered in said buffer, then performs the picture generation and supplements the missing picture, and said substitute reference picture is determined based on a position of the missing reference picture in the set of reference pictures.

3. A moving picture data decoding method of executing a decoding process including picture generation by interframe prediction based on a compressed moving picture datastream, by which a computer executes:

buffering a predetermined quantity of already-decoded pictures decoded by the decoding process;

generating pictures, when there is a missing reference picture in a set of reference pictures used for the interframe prediction for generating a picture, in a way that acquires a substitute reference picture with which to substitute the missing reference picture from the already-decoded pictures buffered in said buffering; and outputting, to a display device, in a state of being buffered with the predetermined quantity of already-decoded pictures, video signals based on the already-decoded pictures with a delay of a predetermined period of time which is longer than a delay occurring due to the decoding process, since the time when the compressed moving picture datastream has been received or input, wherein said picture generating includes, when the missing picture occurs due to a lack of information of the compressed moving picture datastream, acquiring a reference picture or the substitute reference picture from the already-decoded pictures buffered in said buffering, then performing the picture generation and supplementing the missing picture, and said substitute reference picture is determined based on a position of the missing reference picture in the set of reference pictures.

4. A non-transitory readable-by-computer recording medium recorded with a moving picture data decoding program for executing a decoding process including picture generation by interframe prediction based on a compressed moving picture datastream, said program making a computer execute:

buffering a predetermined quantity of already-decoded pictures decoded by the decoding process;

generating pictures, when there is a missing reference picture in a set of reference pictures used for the interframe prediction for generating a picture, in a way that acquires a substitute reference picture with which to substitute the missing reference picture from the already-decoded pictures buffered in said buffering; and outputting, to a display device, in a state of being buffered with the predetermined quantity of already-decoded pictures, video signals based on the already-decoded pictures with a delay of a predetermined period of time which is longer than a delay occurring due to the decoding process, since the time when the compressed moving picture datastream has been received or input, wherein said picture generating includes, when the missing picture occurs due to a lack of information of the compressed moving picture datastream, acquiring a reference picture or the substitute reference picture from the already-decoded pictures buffered in said buffering, then performing the picture generation and supplementing the missing picture, and said substitute reference picture is determined based on a position of the missing reference picture in the set of reference pictures.

* * * * *